United States Patent [19]
Coggon et al.

[11] Patent Number: 5,709,133
[45] Date of Patent: Jan. 20, 1998

[54] LINEAR LOCKING DEVICE

[75] Inventors: Richard J. Coggon; Gulam Premji, both of Mississauga; Adolf Notta, Toronto; Velio Pressacco, Mississauga, all of Canada

[73] Assignee: Bertrand Faure Components Ltd., Mississauga, Canada

[21] Appl. No.: 604,609

[22] Filed: Feb. 21, 1996

[30] Foreign Application Priority Data

Nov. 9, 1995 [CA] Canada ................ 2 162 524

[51] Int. Cl.⁶ ................ B60N 2/20; G05G 5/22
[52] U.S. Cl. ................ 74/531; 297/362.12; 297/375; 188/67
[58] Field of Search ................ 74/531; 188/67; 297/362.12, 362.14, 374, 375

[56] References Cited

U.S. PATENT DOCUMENTS

| | | | |
|---|---|---|---|
| 1,670,555 | 5/1928 | Ulrich | 297/375 X |
| 3,001,821 | 9/1961 | Marechal | 297/375 X |
| 3,633,964 | 1/1972 | Bertin | 297/375 |
| 3,793,903 | 2/1974 | Pellman | 74/531 |
| 4,930,368 | 6/1990 | Nagano | 74/531 X |

FOREIGN PATENT DOCUMENTS

| | | |
|---|---|---|
| 1388944 | 1/1965 | France . |
| 87020 | 4/1966 | France . |
| 1951110 | 5/1971 | Germany . |

*Primary Examiner*—Richard M. Lorence
*Attorney, Agent, or Firm*—Patrick J. Hofbauer

[57] ABSTRACT

An infinitely adjustable linear locking assembly for vehicle seats is disclosed which includes a movable elongated element defining a longitudinal axis. First and second roller ball assemblies coaxial with the elongated element are provided, which assemblies have at least two substantially equidistantly spaced apart roller balls surrounding the elongated element. First and second roller ball housings contain the first and second roller ball assemblies, respectively. The housings are coaxial with the elongated element and have internal wedging surfaces for wedging the roller balls between the internal wedging surfaces and the elongated element. A rotatable locking member is provided adjacent to each roller ball assembly, with the locking member being coaxial with the moveable element and rotatable about the elongated element. Each locking member has a cam for urging each roller ball in an adjacent roller ball assembly into wedging relationship between the internal wedging surface and the elongated element upon rotation of the locking member in a first direction, and for releasing the wedging relationship upon rotation of the locking member in a second direction which is reverse to the first direction.

14 Claims, 6 Drawing Sheets

5,709,133

LINEAR LOCKING DEVICE

FIELD OF THE INVENTION

The present invention relates to mechanisms for selectively locking, in infinitely adjustable relation to each other, a stationary element and a moveable element cooperatively mounted on the stationary element, such as on vehicle seats.

BACKGROUND OF THE INVENTION

Manually operable infinitesimally adjustable locking mechanisms for vehicle seat tracks and reclining vehicle seat backs have recently come into favour, in many instances, over older, less sophisticated incrementally adjustable locking mechanisms for the same purpose.

German Offenlegungsschrift No. 1,951,110 (Pöschl et al.) discloses a locking mechanism for a reclining seat back. The Offenlegungsschrift shows roller members, e.g. ball bearings in contact with the central shaft or in contact with the slanted wedging surface of the housing, or in contact with both the shaft and the slanted wedging surface (see FIGS. 1 and 6). The locking mechanism is biased in the locked position by means of a spring and is released from the locked position by means of an eccentric cam (26 in FIG. 2 and 226 in FIG. 7). A significant drawback encountered with the locking mechanism as disclosed in the Pöschl et al. reference involves the forced movement of each roller member with the eccentric cam. When the cam is selectively moved from its locking position to its unlocking position, the roller member is forced to concurrently move with the cam, thus causing immediate positive unlocking of the roller members. Forcing the immediate positive unlocking of the roller members is highly undesirable in certain situations, such as when the locking mechanism is in a load bearing condition, wherein the locking mechanism is actively supporting a load, as might occur when the vehicle seat occupant is leaning back against the seat back of the vehicle seat. It can be seen that the locking mechanism would unlock immediately, even under load bearing conditions, thus causing the seat back of the vehicle seat to suddenly recline in an unrestricted manner, potentially injuring the vehicle seat occupant.

An improved locking mechanism which is relatively inexpensive and easy to make, yet is particularly effective, has now been found.

SUMMARY OF THE INVENTION

In accordance with the present invention there is disclosed a vehicle seat assembly having a seat locking assembly, said seat locking assembly comprising:

a) a moveable elongated element defining a longitudinal axis;

b) first and second roller ball assemblies which are coaxial with said elongated element, each roller ball assembly having at least two substantially equidistantly spaced-apart roller balls surrounding said elongated element;

c) first and second roller ball housings for containing said first and second roller ball assemblies respectively, which housings are coaxial with said elongated element and which have internal wedging surfaces for wedging said roller balls between said internal wedging surfaces and the elongated element;

d) a locking member adjacent each roller ball assembly, said locking member being coaxial with said moveable element and rotatable about said elongated element, each locking member having cam means for urging each roller ball in an adjacent roller ball assembly into wedging relationship between said internal wedging surface and said elongated element upon rotation of said locking member in a first direction so as to attain frictionally arresting contact of said roller balls and said elongated element, and for releasing the wedging relationship upon rotation of said locking member in a second direction which is reverse to the first direction, so as to release said frictionally arresting contact; and, e) a fixed retainer for retaining said roller ball assemblies, roller ball housings and locking members in cooperating relationship, and allowing said elongated element to move in a direction of said longitudinal axis.

In one embodiment the seat locking assembly additionally has a roller ball release means for urging said first and second ball assemblies out of wedging engagement with said internal wedging surfaces and said elongated element.

In a further embodiment the locking assembly is located between said first and second roller ball assemblies, wherein said locking assembly has first and second generally planar surfaces adjacent said first and second ball assemblies respectively, each generally planar surface being in transverse relation to said longitudinal axis and wherein said cam means comprises a plurality of raised cam surfaces formed on each of said generally planar surfaces in equidistantly spaced, circumferential relation about said longitudinal axis, said cam surfaces being obliquely oriented to said planar surface, and wherein each cam surface is in contacting relationship with a roller ball; and wherein each of said internal wedging surfaces of said roller ball housings has a first internal diameter, proximal to said locking member, sufficient to allow corresponding roller balls to be contained between said internal wedging surface and said elongated element and a second internal diameter distal to and smaller than said first internal diameter.

In another embodiment each of said internal wedging surfaces has grooves therein, each groove being for guiding a corresponding roller ball along a path which is parallel to said longitudinal axis.

In a further embodiment each of said roller ball assemblies consists of a plurality of roller balls.

In another embodiment each roller ball release means comprises spring means surrounding said elongated member and located inside a corresponding roller ball housing, said spring means being compressible between corresponding roller balls and a retaining end inside said roller ball housing.

In a further embodiment the spring means is selected from the group consisting of compression springs and spring washers.

In yet another embodiment said annular locking assembly is located between said first and second roller ball assemblies, and wherein each of said roller ball assemblies comprise a plurality of roller balls in a ball cage, said ball cage allowing free rotation of said roller balls and movement of said roller balls into and out of wedging relationship between said internal wedging surface and said elongated element, said locking assembly and each ball cage having cooperating screw threads, thereby permitting first and second roller ball assemblies to move in unison away from one another upon rotation of said locking assembly in said first direction and towards one another upon rotation of said locking assembly in said second direction In a further embodiment said elongated element is a shaft having a circular cross-section.

In another embodiment the first and second roller ball assemblies are between corresponding first and second annular locking assemblies, wherein each locking assembly has a generally planar surface adjacent the corresponding roller ball assembly, each generally planar surface being in transverse relation to said longitudinal axis and wherein said cam means comprises a plurality of raised cam surfaces formed on each of said generally planar surfaces in equidistantly spaced, circumferential relation about said longitudinal axis, said cam surfaces being obliquely oriented to said planar surface, and wherein each cam surface is in contacting relationship with a roller ball; and wherein each of said internal wedging surfaces of said roller ball housings has a first internal diameter, proximal to the adjacent locking member, sufficient to allow corresponding roller balls to be contained between said internal wedging surface and said elongated element and a second internal diameter distal to and smaller than said first internal diameter.

In yet another embodiment said first and second roller ball assemblies are located between corresponding first and second annular locking assemblies, and wherein each of said roller ball assemblies comprise a plurality of roller balls in a ball cage, said ball cage allowing free rotation of said roller balls and movement of said roller balls into and out of wedging relationship between said internal wedging surface and said elongated element, each locking assembly and each corresponding ball cage having cooperating screw threads, said locking assemblies being connected to permit first and second roller ball assemblies to move in unison away from one another upon rotation of said locking assembly in said second direction and towards one another upon rotation of said locking assembly in said first direction.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

FIG. 3 is in the unlocked position and FIG. 4 is in the locked position.

DETAILED DESCRIPTION OF A PREFERRED EMBODIMENT

Figure 1:
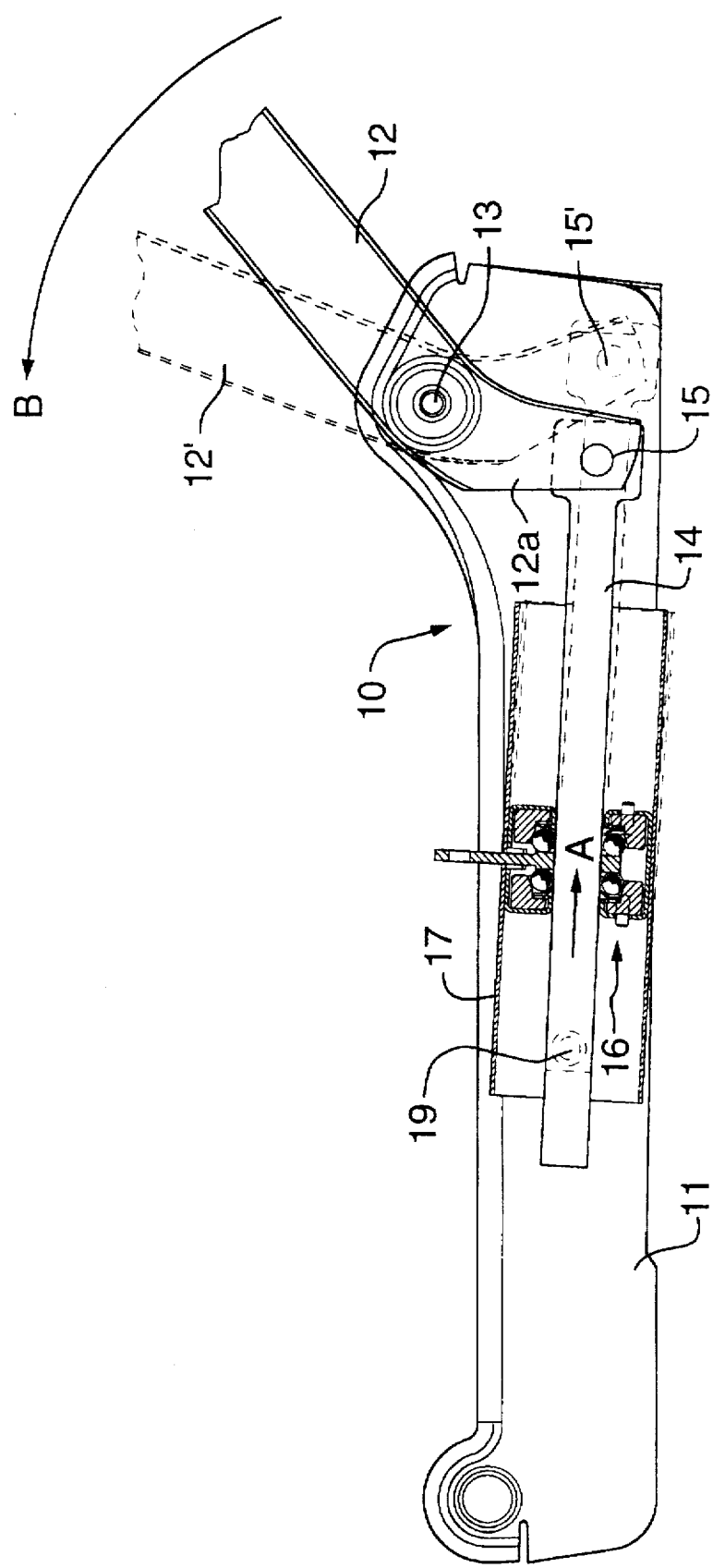
FIG. 1 of the drawings appended hereto is a side view of a seat assembly incorporating a locking device according to one embodiment of the present invention.

Referring to FIG. 1 of the drawings, a vehicle seat 10 has a base 11. Connected thereto by pivot 13 is a reclining back 12 with a lever arm 12a. Pivotally attached to base 11 is cylindrical locking device frame 17 in which is rigidly mounted a locking device 16. The pivot point attachment 19 of the locking frame 17 is shown in dotted outline in FIG. 1, and is preferably positioned toward the front (left) end of the frame 17, with the axis of the pivot point attachment 19 transversely intersecting the horizontal mid-line of the frame 17. Attached to lever arm 12a, by a pivot 15 is an elongated shaft 14. Shaft 14 passes coaxially through the locking device 16. When the locking device 16 is in an unlocked position and the seat back 12 is moved in the direction of arrow B to a position indicated by dotted lines at 12', the pivot 15 is moved to position 15' and the shaft 14 is moved in the direction of arrow A. Pivotal movement of the locking device frame 17 about pivot point attachment 19 to the position shown in dotted outline in FIG. 1 accommodates the corresponding arcuate movement of the pivot 15 to position 15'. When the seat back 12 is in the desired position, locking device 16 is moved to a locking position as will be described hereinafter. The seat back may then be locked in the desired position. It will be clear to those skilled in the art that this combination of shaft and locking device allows locking of the shaft at substantially any position along its length, and thus locking of the seat back may be effected in any desired position.

Thus far, the locking device 16 has been illustrated and described in relation to a vehicle seat installation where it is used to control the inclination angle of a seat 10 relative to a base 11. It will be further described and illustrated herein, but it will be readily apparent to those skilled in the art that a similarly configured locking device may be adapted by routine design changes to control the relative movement of the base along a seat track (not shown) relative to the floor (not shown) of a vehicle (not shown). Accordingly, the locking device of the present invention may be used to control the forward to rear positioning of a vehicular seat. Such routine adaptation is within the expressed scope of the claimed invention.

Figure 2:
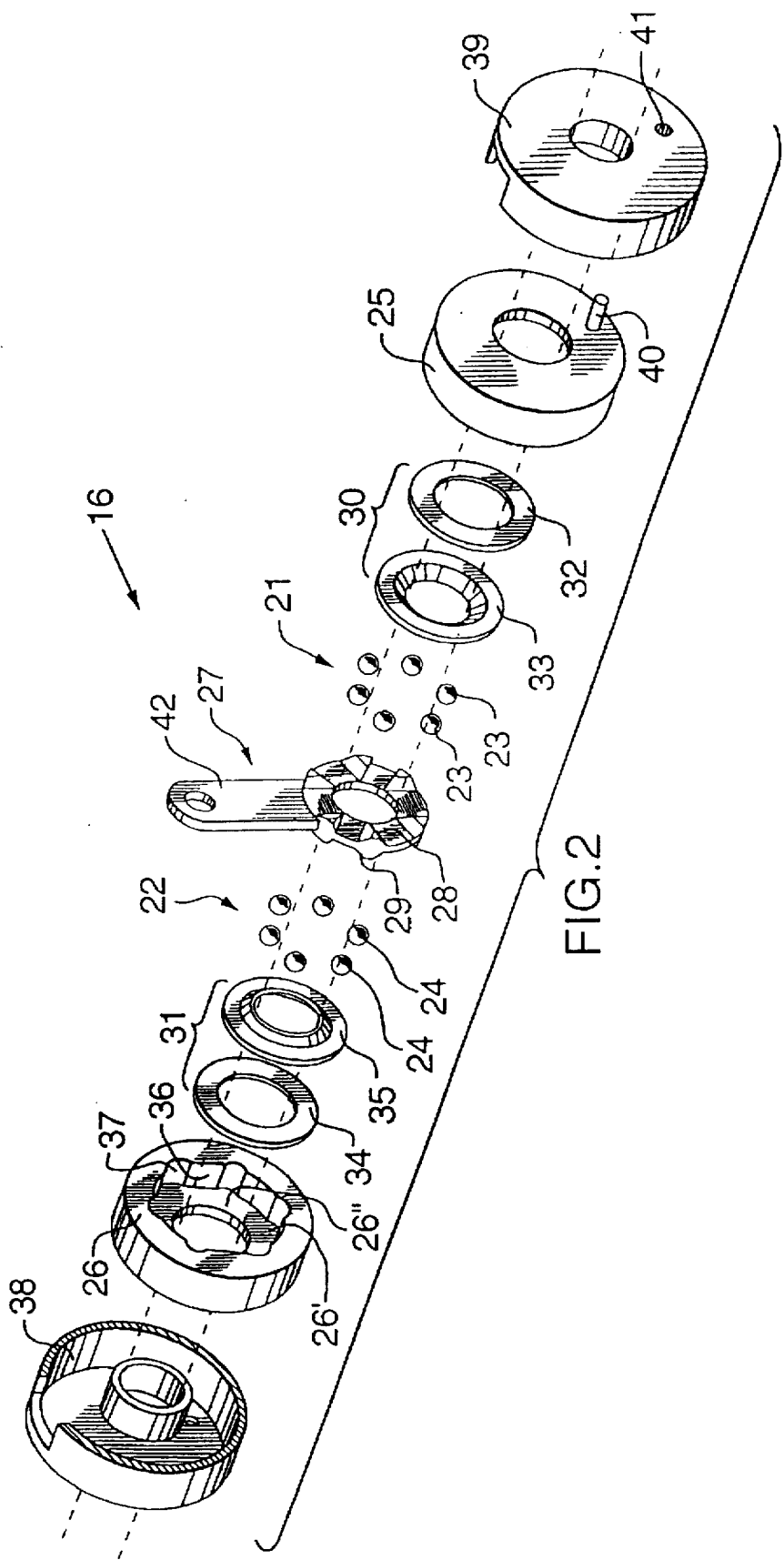
FIG. 2 of the drawings is an exploded view of the components for the locking device of FIG. 1.
Figure 3:
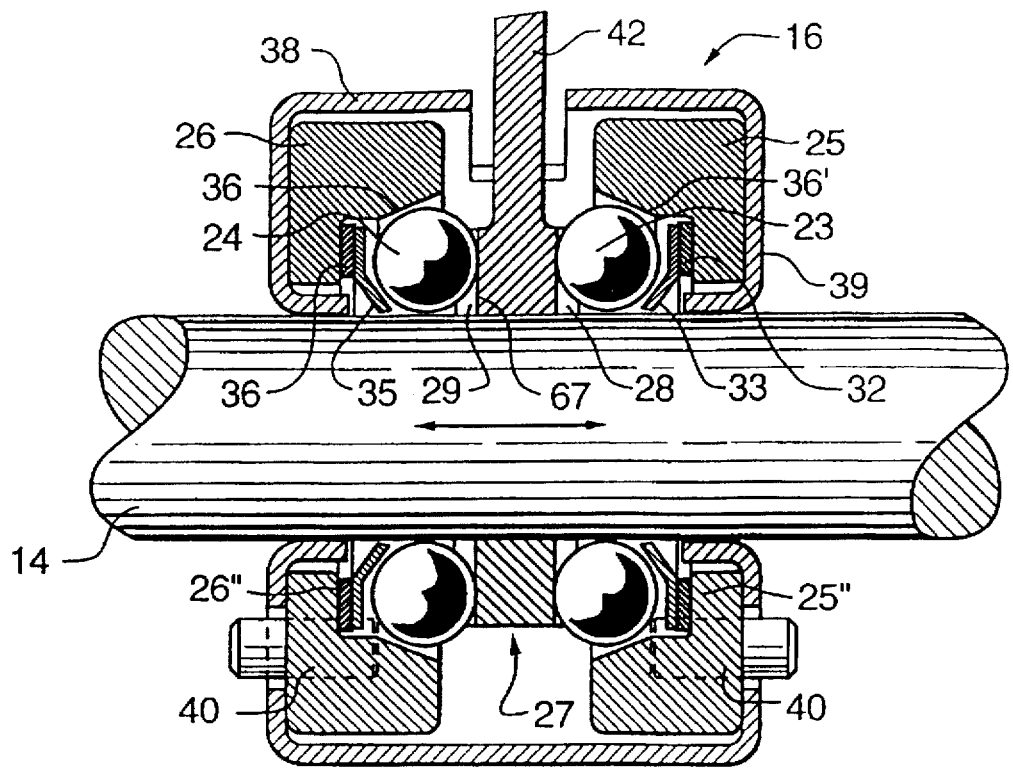
FIGS. 3 and 4 are cross-sectional views of the locking device of FIG. 1.
Figure 4:
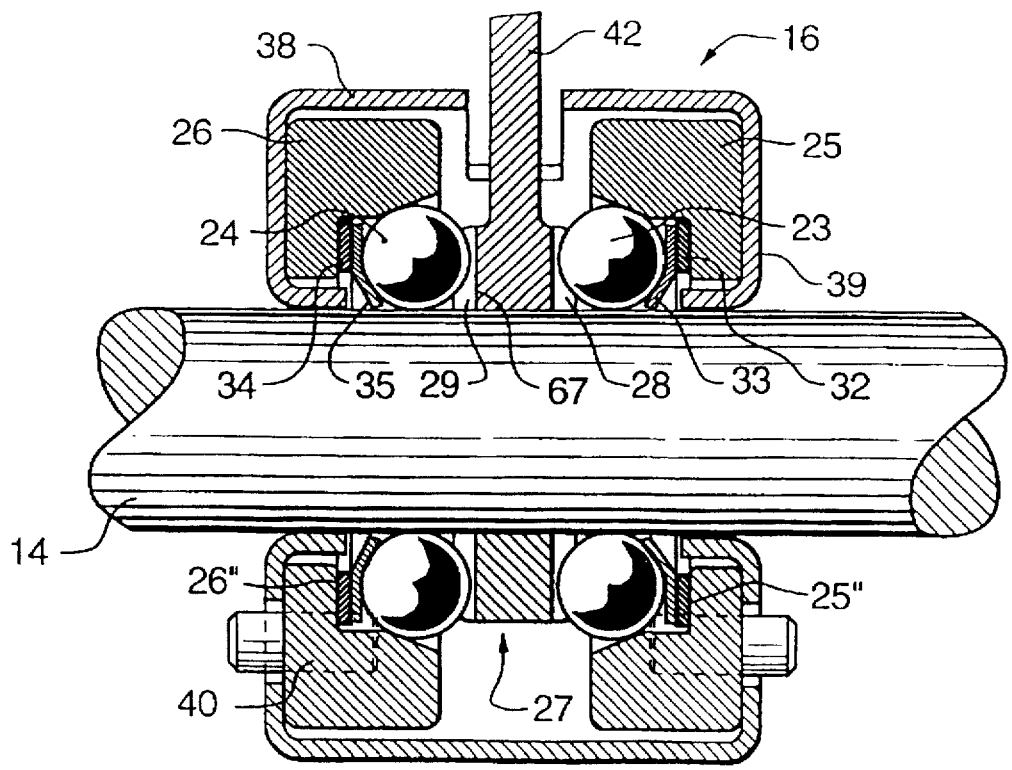

A first embodiment of locking device 16 according to the invention is illustrated in FIGS. 2, 3 and 4. Locking device 16 comprises first and second roller ball assemblies 21 and 22 respectively, first and second roller ball housings 25 and 26 respectively, a locking member 27, roller ball release means 30 and 31 and retainer housings 38 and 39. All of these components are coaxially disposed about shaft 14, which is not shown in FIG. 2 but is shown in FIGS. 1, 3 and 4. In the embodiment shown in FIGS. 1, and 2 to 4 each of the roller ball assemblies 21 and 22 consist of roller balls 23 and 24 respectively. Roller ball housing 26 has a cavity 26' therein. Roller ball housing 25 has a similar cavity which is not shown in FIG. 2. A roller ball release means 31 fits inside cavity 26', resting against end 26" of the roller ball housing 26. The diameter of the opening of cavity 26' is greater than the diameter at end 26", thus providing slant to inner wall 36. The shape of inner wall 36 is in the form of the outside of a truncated pyramid. Wall 36 may have longitudinal grooves 37 therein for receiving roller balls 24. While grooves 37 are not essential, they are desirable in order to provide control over the movement of roller balls 24 in a direction parallel to the longitudinal axis of shaft 14, and to provide a greater area of contact between roller balls 24 and roller ball housing 26. Roller ball housing 25 has a cavity, slanted walls and grooves similar to those shown in relation to roller ball housing 26, as will be seen more clearly in FIGS. 3 and 4.

Locking member 27 comprises an annular ring with an attached lever 42 for rotating locking member 27. In FIG. 2 it will be seen that first roller ball assembly 21 has six roller balls 23. Locking member 27 has six corresponding cams 28 on the face adjacent to first roller ball assembly. On the face of locking member 27 which is adjacent to roller ball assembly 32, there are six cam faces corresponding to six roller balls 24.

Referring more specifically to FIG. 3, which shows locking device 16 in its unlocked position, shaft 14 is able to move in the direction of its longitudinal axis as shown by the double headed arrow. Retainers 38 and 39 are held in position by locking device frame 17 (see FIG. 1), so they do not rotate and so that they encase the locking device components therein. Retainers 38 and 39 are also fixed relative to one another in order to withstand locking thrusts when the locking device is in its locked position. Roller ball housing 25 is held in position and prevented from rotating by stud 40 which is secured through a hole 41 in retainer 39. Roller ball housing 26 is similarly retained in retainer 38. With reference to roller ball housing 26, locking release assembly 31, which comprises an O-ring 34 and a spring washer 35, are seated adjacent to end 26". The purpose of O-ring 34 and spring washer 35 is to urge roller ball 24 out of wedging relationship between shaft 14 and slanted face 36 when the device 16 is initially unlocked. In FIG. 3, the locking member 27 has been rotated so that roller balls 24 rest against cam faces 29 close to position 67. Position 67 is in a generally planar surface which is transverse in relation to the longitudinal axis of shaft 14. Cam surfaces 29 are raised relative to planar surface 67.

FIG. 4 shows locking device 16 in a locked position. Locking member 27 has been rotated in a first direction by lever 42, thereby forcing roller balls 24 into cavity 26' by reason of the force caused by roller balls 24 riding along cam surfaces 29. Roller balls 24 are thus forced into cavity 26' along grooves 37 towards end 26". In so moving, roller balls 24 push against spring washer 35 and compress spring washer 35 and O-ring 34 against end 26". It will be appreciated that lever 42 should be secured, e.g. by spring biasing to the locked position, or locking with a pin or similar, so that vibration does not cause unlocking of device 16 by rotation of locking member 27 in a second direction reverse to said first direction. When locking device 16 is to be unlocked, lever 42 is moved in the second direction, thus allowing roller balls 24 to follow cam surface 29 back to planar position 67 as a result of urging by O-ring 34 and spring washer 35. The O-ring 34 and spring washer 35 are optional, but are preferred as they ensure positive unlocking.

It will be understood that although the foregoing discussion has focused upon roller ball assembly 22 and its associated roller ball housing 26, equivalent actions occur simultaneously with roller ball assembly 21 and roller ball housing 25. However, it will be further appreciated that the locking action of roller ball assembly 22 and its associated roller ball housing 26 serve to lock the shaft 14 substantially against linear translational movement in a direction towards the left of FIGS. 3 and 4, while roller ball assembly 21 and roller ball housing 25 serve to lock the shaft 14 substantially against linear translational movement in an opposite direction, (i.e., towards the right of FIGS. 3 and 4).

It will be apparent to those skilled in the art that modifications may be made to the components described herein without departing from the spirit of the invention. For example O-rings 32 and 34 and spring washers 33 and 35 may be replaced by spiral compression springs (not shown). Shaft 14 may have longitudinal grooves (not shown) therein, in order to provide greater contact area between the roller balls 23, 24 and shaft 14.

It has been found that in some circumstances, such as when the shaft 14 is under continuous loading and thus urging the roller balls toward locking engagement, that the roller balls 23 and 24 can be wedged so firmly in their respective roller ball housings that particularly strong spring washers 33 and 35 are required. In such circumstance it is preferable to utilize the embodiment shown in FIG. 5. In this embodiment, the roller ball assemblies are positively moved into and out of the cavities in the roller bearing housings by means of threaded engagement with the locking member. Locking member 52 has a body 67 which has threads 68 and 69. Threads 68 and 69 are in opposing handedness. For example, thread 68 is an internal right-hand thread and thread 69 is an internal left-hand thread. First roller ball assembly 51 comprises a body 61 with an external left-hand thread 66 which is adapted to engage with left-hand internal thread 69. Second roller ball assembly comprises body 55 with an external right-hand thread 60 which is adapted to cooperate with internal right-hand thread 68. Roller ball assemblies 51 and 50 have apertures 62 and 56 respectively for retaining roller balls 63 and 57 respectively. Each roller ball assembly 51 and 52 has a chamfered end 64 and 58 respectively to provide clearance for entry into the cavities in corresponding roller ball housings 54 and 53. When locking member 52 is threadingly engaged with roller ball assemblies 51 and 50, rotation of locking member 52 in a first direction will cause roller ball assemblies 51 and 50 to travel in a direction parallel to the longitudinal axis of shaft 14 and away from one another. In so doing, roller balls 63 and 57 become wedged between shaft 14 and surfaces 65 and 59 respectively of the corresponding roller ball housings 54 and 53. When locking member 52 is rotated in the reverse direction, the threaded engagements of threads 66 and 69, and 60 and 68 positively withdraw roller balls assemblies 51 and 50 towards one another and out of wedging relationship with shaft 14 and roller ball housings 54 and 53. In this embodiment, there is no need for any spring means to urge roller balls 63 and 57 out of such wedging relationship.

Figure 6:
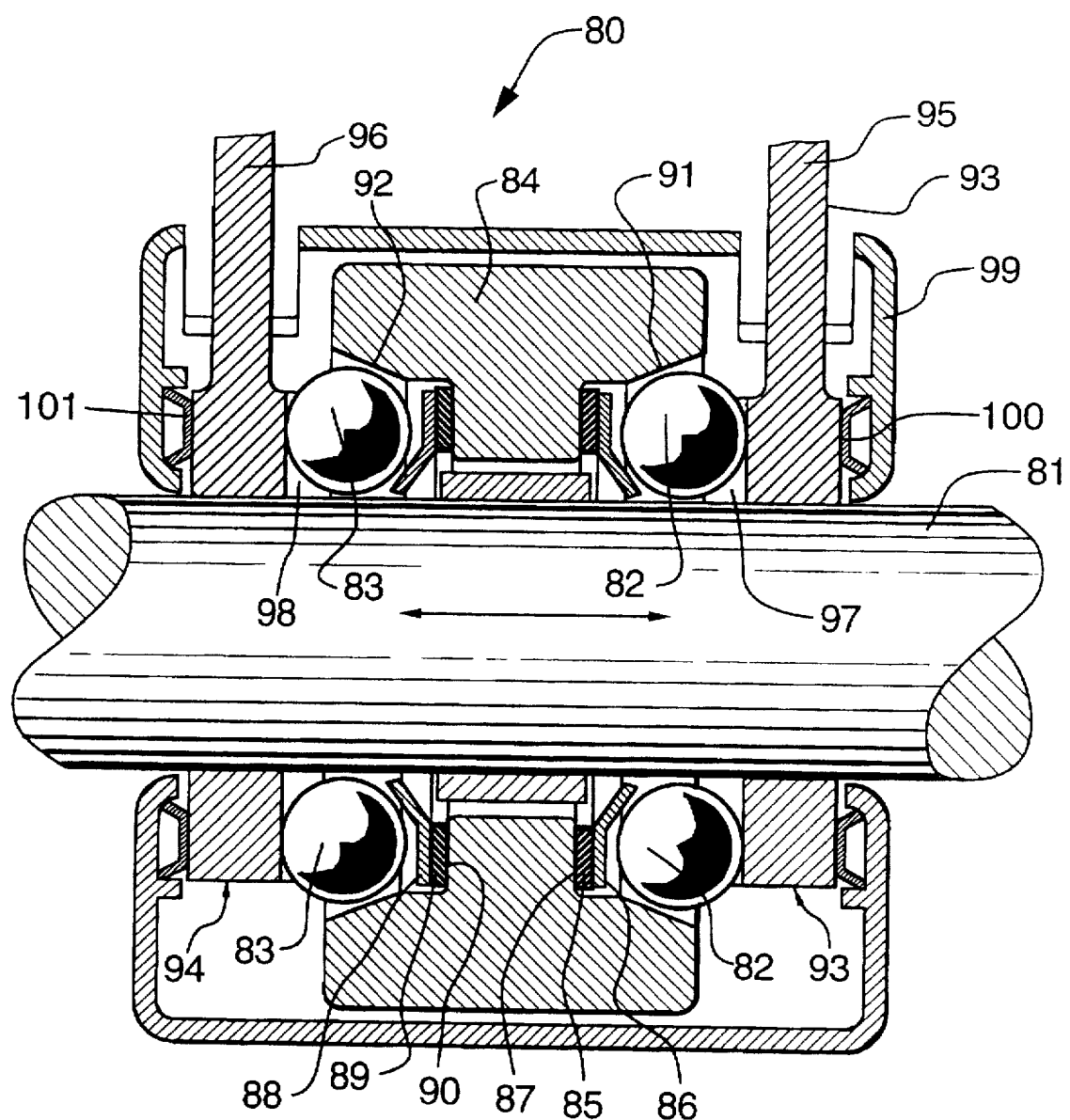
FIG. 6 is a cross-sectional views of a third embodiment of a locking device according to the invention, in the unlocked position.

In another embodiment, locking device 80 is illustrated in FIG. 6. Locking device 80 is coaxially disposed about shaft 81. Each of the roller ball assemblies comprise roller balls 82 and 83 respectively. Instead of having two roller ball housings as shown in FIG. 3, the roller ball housings for the roller balls are combined into a single housing 84 with two cavities therein. Roller ball release means for roller balls 82 consist of spring washer 86 and O-ring 85 which fits inside one cavity, resting against end 87. Similarly, roller ball release means for roller balls 83 comprise spring washer 88 and O-ring 89 which fits inside the second cavity, resting against end 90. The inner walls 91 and 92 of the cavities of roller ball housing 84 have a diameter at the opening of cavities greater than the diameter at ends 87 and 90 respectively in order to provide slant to the wall. Walls 91 and 92 may have longitudinal grooves therein (not shown) for receiving roller balls 82 and 83 respectively.

Each roller ball assembly has a separate locking member 93 and 94, with attached levers 95 and 96 respectively for rotating the locking members. Each locking member has a number of cams (numeral 97 on locking member 93, and numeral 98 on locking member 94) on the locking member face adjacent to a corresponding roller ball assembly. The number of cams correspond to the number of roller balls in the adjacent roller ball assembly. Typically there are from 5 to 8 cams on each locking member, preferably 6 cams. The aforementioned components of locking device 80 are held in place by retainer housing 99. Members 100 and 101, e.g. bushings or springs, allow rotation of locking members 93 and 94 respectively in relation to retainer 99. Cams 97 and 98 are oriented so that when locking members 93 and 94 rotate in the same direction towards the locking position, they push balls 82 and 83 towards one another. When in the unlocked position shaft 81 is able to move in the direction of its longitudinal axis as shown by the double headed arrow.

Conventional spring means (not shown) are preferably employed to bias the locking members 93 and 94 towards the locking position. Thus, one operation simultaneously rotates the locking members 93 and 94 against such biasing to unlock the device 80.

Figure 5:
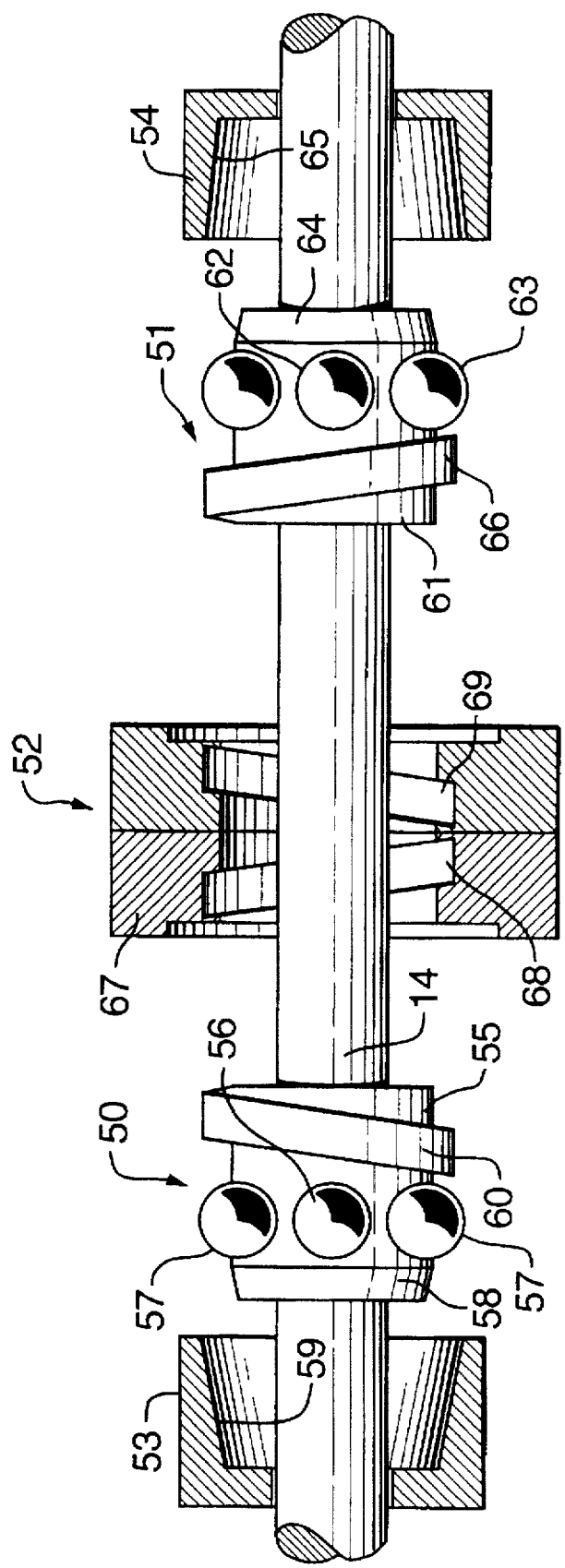
FIG. 5 is an exploded view of the components of a second embodiment of a locking device according to the invention.
Figure 7:
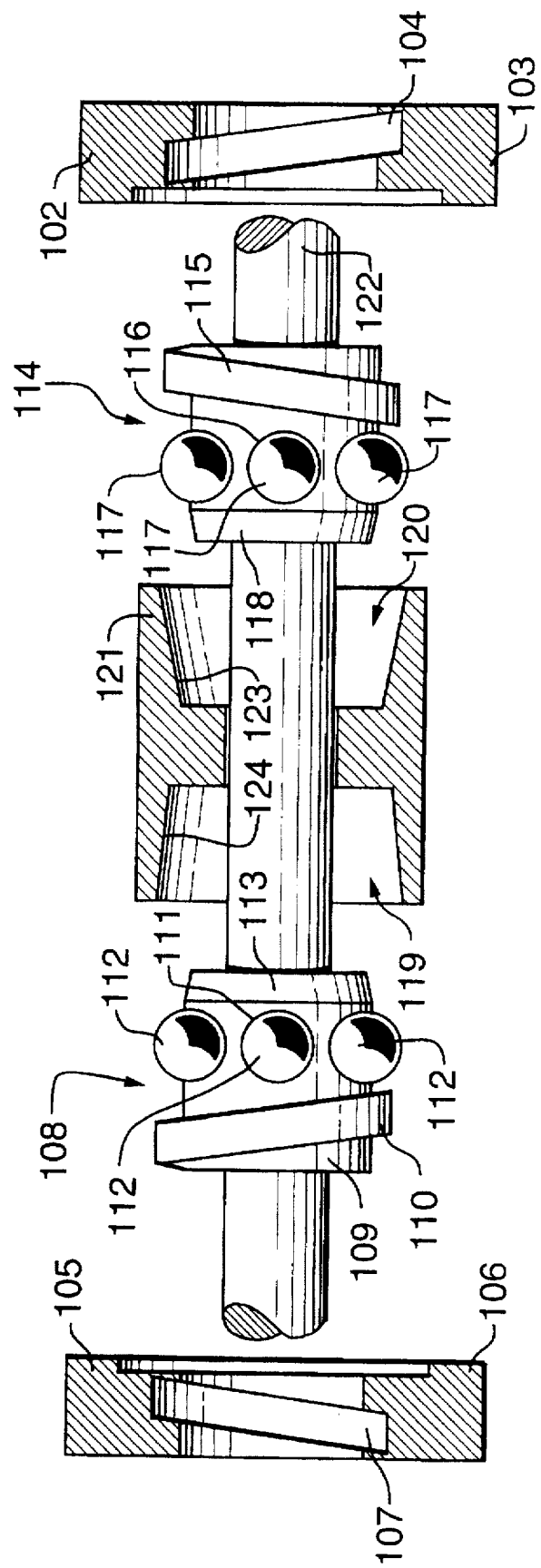
FIG. 7 is an exploded view of the components of a fourth embodiment of a locking device according to the invention.

FIG. 7 shows a modified embodiment of the locking device shown in FIG. 5. As with the embodiment of FIG. 5, the roller ball assemblies are positively moved into and out of the cavities in the roller bearing housings by means of threaded engagement with a locking member. One locking member 102 has a body 103 with an internal thread 104. A second locking member 105 has a body 106 with an internal thread 107. Threads 104 and 107 are in opposing handedness. For example, thread 104 is an internal right-hand thread and thread 107 is an internal left-hand thread. First roller ball assembly 108 comprises a body 109 with an external left-hand thread 110 which is adapted to engage with left-hand internal thread 107. Second roller ball assembly comprises body 114 with an external right-hand thread 115 which is adapted to co-operate with internal right-hand thread 104. Roller ball assemblies 108 and 114 have apertures 111 and 116 respectively for retaining roller balls 112 and 117 respectively. Each roller ball assembly 108 and 114 has a chamfered end 113 and 118 respectively, which provide clearance for entry into cavities 119 and 120 corresponding roller ball housing 121. When locking members 102 and 105 are threadingly engaged with roller ball assemblies 114 and 108, rotation of locking members 102 and 105 in a first direction will cause roller ball assemblies 114 and 108 to travel in a direction parallel to the longitudinal axis of shaft 122 and towards one another. In so doing, roller balls 117 and 112 become wedged between surfaces 123 and 124 respectively of the corresponding cavities 120 and 119, and shaft 122. When locking members 102 and 105 are rotated in the reverse direction, the threaded engagements of threads 104 and 115, and 107 and 110 positively withdraw roller balls assemblies 114 and 108 away from one another and out of wedging relationship with roller ball housing 121 and shaft 122.

It will be apparent to those skilled in the art that modifications may be made to the components described herein without departing from the spirit of the invention. For example in the embodiment shown in FIG. 6, cams 97 and 98 may bear against corresponding cams attached to a wall of retainer 99, while the faces of locking members 93 and 94 in contact with balls 82 and 83 may be flat, in a plane perpendicular to the longitudinal axis of shaft 81.

In general the major components are best made of metal, particularly steel. Powdered metal forming techniques may also be advantageously employed to form some or all of the major components.

The main advantages of the present invention are that the locking device is infinitely adjustable, is compact, simple to make, use and maintain, and provides particularly good locking characteristics. Devices according to the present invention exhibit little or no lost motion (i.e., chuck) and can be subjected to extremely high locking loads before failure, as compared with previously known linear locking devices for vehicle applications. This is especially important in modern vehicle seat systems, where loading on the seat locking components has increased dramatically as a result of the attachment of one or more ends of occupant seat belts to the vehicle seat structure. In addition, locking devices constructed according to the invention are modular, which gives great design flexibility, compactness, and simplicity and ease of assembly.

We claim:

1. In a vehicle seat assembly having a seat locking assembly, said seat locking assembly comprising:
   a) a moveable elongated element defining a longitudinal axis;
   b) first and second roller ball assemblies which are coaxial with said elongated element, each roller ball assembly having at least two substantially equidistantly spaced-apart roller balls surrounding said elongated element;
   c) first and second roller ball housings for containing said first and second roller ball assemblies respectively, which housings are coaxial with said elongated element and which have internal wedging surfaces for wedging said roller balls between said internal wedging surfaces and the elongated element;
   d) a locking member adjacent each roller ball assembly, said locking member being coaxial with said moveable element and rotatable about said elongated element, each locking member having cam means for urging each roller ball in an adjacent roller ball assembly into wedging relationship between said internal wedging surface and said elongated element upon rotation of said locking member is rotated in a first direction so as to attain frictionally arresting contact of said roller balls and said elongated element, and for releasing the wedging relationship upon rotation of locking member in a second direction which is reverse to the first direction, so as to release said frictionally arresting contact; and
   e) a fixed retainer for retaining said roller ball assemblies, roller ball housings and locking members in cooperating relationship, and allowing said elongated element to move in a direction of said longitudinal axis.

2. A vehicle seat assembly according to claim 1 wherein said locking assembly is located between said first and second roller ball assemblies, wherein said locking assembly has first and second generally planar surfaces adjacent said first and second roller ball assemblies respectively, each generally planar surface being in transverse relation to said longitudinal axis and wherein said cam means comprises a plurality of raised cam surfaces formed on each of said generally planar surfaces in equidistantly spaced, circumferential relation about said longitudinal axis, said cam surfaces being obliquely oriented to said planar surface, and wherein each cam surface is in contacting relationship with a roller ball; and wherein each of said internal wedging surfaces of said roller ball housings has a first internal diameter, proximal to said locking member, sufficient to allow corresponding roller balls to be contained between said internal wedging surface and said elongated element and a second internal diameter distal to and smaller than said first internal diameter.

3. A vehicle seat assembly according to claim 2 wherein each of said internal wedging surfaces has grooves therein, each groove being for guiding a corresponding roller ball along a path which is parallel to said longitudinal axis.

4. A vehicle seat assembly according to claim 3 wherein each of said roller ball assemblies comprise a plurality of roller balls.

5. A vehicle seat assembly according to claim 4 wherein said elongated element is a shaft having a circular cross-section.

6. A vehicle seat assembly according to claim 1 which additionally contains a roller ball release means for urging said first and second roller ball assemblies out of wedging engagement with said internal wedging surfaces and said elongated element.

7. A vehicle seat assembly according to claim 6 wherein each of said internal wedging surfaces has grooves therein, each groove being for guiding a corresponding roller ball along a path which is parallel to said longitudinal axis.

8. A vehicle seat assembly according to claim 7 wherein each of said roller ball assemblies comprise a plurality of roller balls.

9. A vehicle seat assembly according to claim 8 wherein said elongated element is a shaft having a circular cross-section.

10. A vehicle seat assembly according to claim 6 wherein each roller ball release means is selected from the group consisting of compression springs and spring washers, and wherein said roller ball release means surrounds said elongated member and is located inside a corresponding roller ball housing, said spring means being compressible between corresponding roller balls and a retaining end inside said roller ball housing.

11. A vehicle seat assembly according to claim 1 wherein said annular locking assembly is located between said first and second roller ball assemblies, and wherein each of said roller ball assemblies comprise a plurality of roller balls in a ball cage, said ball cage allowing free rotation of said roller balls and movement of said roller balls into and out of wedging relationship between said internal wedging surface and said elongated element, said locking assembly and each ball cage having cooperating screw threads, thereby permitting first and second roller ball assemblies to move in unison away from one another upon rotation of said locking assembly in said first direction and towards one another upon rotation of said locking assembly in said second direction.

12. A vehicle seat assembly according to claim 11 wherein said elongated element is a shaft having a circular cross-section.

13. A vehicle seat assembly according to claim 1 wherein first and second roller ball assemblies are between corresponding first and second annular locking assemblies, wherein each locking assembly has a generally planar surface adjacent the corresponding roller ball assembly, each generally planar surface being in transverse relation to said longitudinal axis and wherein said cam means comprises a plurality of raised cam surfaces formed on each of said generally planar surfaces in equidistantly spaced, circumferential relation about said longitudinal axis, said cam surfaces being obliquely oriented to said planar surface, and wherein each cam surface is in contacting relationship with a roller ball; and wherein each of said internal wedging surfaces of said roller ball housings has a first internal diameter, proximal to the adjacent locking member, sufficient to allow corresponding roller balls to be contained between said internal wedging surface and said elongated element and a second internal diameter distal to and smaller than said first internal diameter.

14. A vehicle seat assembly according to claim 1 wherein said first and second roller ball assemblies are located between corresponding first and second annular locking assemblies, and wherein each of said roller ball assemblies comprise a plurality of roller balls in a ball cage, said ball cage allowing free rotation of said roller balls and movement of said roller balls into and out of wedging relationship between said internal wedging surface and said elongated element, each locking assembly and each corresponding ball cage having cooperating screw threads, said locking assemblies being connected to permit first and second roller ball assemblies to move in unison away from one another upon rotation of said locking assembly in said second direction and towards one another upon rotation of said locking assembly in said first direction.

* * * * *